(12) United States Patent
Takegami

(10) Patent No.: US 8,929,098 B2
(45) Date of Patent: Jan. 6, 2015

(54) DC-DC CONVERTER

(75) Inventor: Eiji Takegami, Tokyo (JP)

(73) Assignee: TDK-Lambda Corporation, Tokyo (JP)

( * ) Notice: Subject to any disclaimer, the term of this patent is extended or adjusted under 35 U.S.C. 154(b) by 692 days.

(21) Appl. No.: 13/159,011

(22) Filed: Jun. 13, 2011

(65) Prior Publication Data

US 2011/0310637 A1 Dec. 22, 2011

(30) Foreign Application Priority Data

Jun. 17, 2010 (JP) ................ 2010-138735

(51) Int. Cl.
*H02M 3/335* (2006.01)
*H02J 7/00* (2006.01)
*H02J 7/34* (2006.01)

(52) U.S. Cl.
CPC .......... *H02M 3/33584* (2013.01); *H02J 7/0052* (2013.01); *H02J 2007/0059* (2013.01); *H02J 7/34* (2013.01)
USPC ............................................ 363/16; 320/166

(58) Field of Classification Search
USPC ............................................ 363/16; 320/166
See application file for complete search history.

(56) References Cited

U.S. PATENT DOCUMENTS

| | | | |
|---|---|---|---|
| 5,798,633 A | 8/1998 | Larsen et al. | |
| 6,876,556 B2* | 4/2005 | Zhu et al. | 363/17 |
| 7,450,401 B2* | 11/2008 | Iida | 363/16 |
| 2002/0186576 A1 | 12/2002 | Kanouda et al. | |
| 2006/0132102 A1* | 6/2006 | Harvey | 320/166 |
| 2007/0086222 A1 | 4/2007 | Iida | |
| 2008/0062724 A1 | 3/2008 | Feng et al. | |
| 2008/0219032 A1 | 9/2008 | Stancu et al. | |
| 2008/0284387 A1* | 11/2008 | Chen et al. | 323/222 |
| 2009/0108677 A1 | 4/2009 | Walter et al. | |
| 2010/0045102 A1 | 2/2010 | Kitanaka | |
| 2011/0037319 A1* | 2/2011 | Matsui et al. | 307/43 |

FOREIGN PATENT DOCUMENTS

| | | |
|---|---|---|
| CN | 1416613 A | 5/2003 |
| CN | 101309050 A | 11/2008 |
| CN | 101764528 A | 6/2010 |
| DE | 10 2008 011 307 A1 | 9/2008 |
| DE | 10 2012 111 063 A1 | 5/2013 |
| DE | 10 2012 111 607 A1 | 7/2013 |
| JP | A-2002-165448 | 6/2002 |
| JP | A-2006-81263 | 3/2006 |
| JP | A-2008-035675 | 2/2008 |
| JP | A-2010-130866 | 6/2010 |
| WO | WO 02/41478 A2 | 5/2002 |

OTHER PUBLICATIONS

Li et al., Analysis and Design of Improved Isolated Full-Bridge Bi-Directional DC-DC Converter, Jun. 2004, IEEE, 35th Annual IEEE PESC, 521-526.*

Office Action dated Feb. 27, 2014 issued in U.S. Appl. No. 13/724,073.

(Continued)

*Primary Examiner* — Jue Zhang
(74) *Attorney, Agent, or Firm* — Oliff PLC

(57) ABSTRACT

A controller controls a voltage-source power converter and a current-source power converter based on a detection value of a rail voltage input to the voltage-source power converter and a detection value of a charging voltage output from the current-source power converter, at the time of charging operation.

16 Claims, 7 Drawing Sheets

(56) References Cited

OTHER PUBLICATIONS

Office Action dated May 7, 2014 issued in U.S. Appl. No. 13/678,715.
Office Action dated Apr. 25, 2014 issued in U.S. Appl. No. 13/686,376.
Office Action dated Aug. 19, 2014 issued in Chinese Patent Application No. 201210468079.1 (with Translation).
Office Action dated Aug. 20, 2014 issued in Chinese Patent Application No. 201210499768.9 (with Translation).
Analysis and Design of Improved Isolated Full-Bridge Bi-Directional DC-DC Converter, Power Electronics Specialists, 2004 IEEE $35^{th}$ Annual, Rongyuan Li, etc. 521-526.
Office Action dated Sep. 3, 2014 issued in Chinese Patent Application No. 201210563040.8 (with translation).

\* cited by examiner ately, the controller 5 controls the voltage-source power converter 4 and the current-source power converter 2 to decrease the charging voltage V2 so that the rail voltage V1 can be increased.

DC-DC CONVERTER

CROSS-REFERENCE TO RELATED APPLICATIONS

This application is based upon and claims the benefit of priority from Japanese Patent Application No. 2010-138735, filed on Jun. 17, 2010, the entire contents of which are incorporated herein by reference.

BACKGROUND OF THE INVENTION

1. Field of the Invention

The present invention relates to a DC-DC converter.

2. Description of the Related Art

To accumulate regenerative energy, which is produced by electric motors, or power-generation energy, which is produced by solar cells, in a storage battery or the like in order to reuse the accumulated energy, a bidirectional DC-DC converter is often used (Japanese Laid-open Patent Publication No. 2008-35675).

However, conventional bidirectional DC-DC converters perform control to increase a charging voltage when the charging voltage decreases due to a decrease in a rail voltage while a bidirectional DC-DC converter performs charging operation. Therefore, a load on the supply side that supplies the rail voltage increases and the rail voltage further decreases, resulting in an increase in variation in the rail voltage, which is a problem.

SUMMARY OF THE INVENTION

A DC-DC converter according to an aspect of the present invention includes a transformer; a voltage-source power converter that performs power conversion by controlling a voltage applied to a primary side of the transformer; a current-source power converter that performs power conversion by controlling current that flows through a secondary side of the transformer; and a controller that controls, at the time of charging operation, the voltage-source power converter and the current-source power converter based on a detection value of a rail voltage input to the voltage-source power converter and a detection value of a charging voltage output from the current-source power converter.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below with reference to the accompanying drawings.

Figure 1:
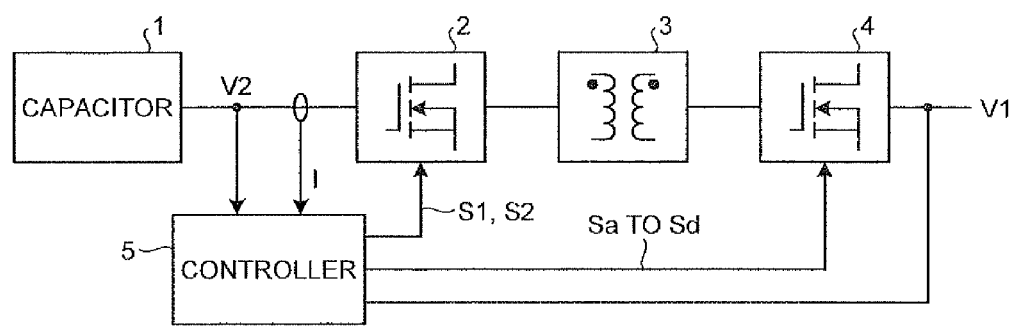
FIG. 1 is a block diagram illustrating the configuration of a DC-DC converter according to a first embodiment of the present invention.

FIG. 1 is a block diagram illustrating the configuration of a DC-DC converter according to a first embodiment of the present invention.

In FIG. 1, the DC-DC converter includes a transformer 3; a voltage-source power converter 4 that performs power conversion by controlling a voltage to be applied to the primary side of the transformer 3; a current-source power converter 2 that performs power conversion by controlling current that flows through the secondary side of the transformer 3; and a controller 5 that controls the voltage-source power converter 4 and the current-source power converter 2. A capacitor 1 is connected to the current-source power converter 2 side.

When the capacitor 1 discharges, direct current supplied from the capacitor 1 is converted into alternating current by the current-source power converter 2, and the alternating current is output to the voltage-source power converter 4 through the transformer 3. The alternating current output through the transformer 3 is converted into direct current by the voltage-source power converter 4, and the direct current is output as a rail voltage V1.

At the time of discharging operation, the controller 5 can control the voltage-source power converter 4 and the current-source power converter 2 based on a detection value of the rail voltage V1 output from the voltage-source power converter 4 and a detection value of a charging current I, without referring to a detection value of a charging voltage V2 input to the current-source power converter 2.

On the other hand, when the capacitor 1 charges, the direct current supplied as the rail voltage V1 is converted into alternating current by the voltage-source power converter 4, and the alternating current is output to the current-source power converter 2 through the transformer 3. The alternating current output through the transformer 3 is converted into direct current by the current-source power converter 2, and the direct current is supplied to the capacitor 1.

At the time of charging operation, the controller 5 controls the voltage-source power converter 4 and the current-source power converter 2 based on both of a detection value of the rail voltage V1 input to the voltage-source power converter 4 and a detection value of the charging voltage V2 output from the current-source power converter 2 as well as based on a detection value of the charging current I. For example, when the rail voltage V1 decreases, the controller 5 controls the voltage-source power converter 4 and the current-source power converter 2 to decrease the charging voltage V2 so that the rail voltage V1 can be increased.

Figure 2:
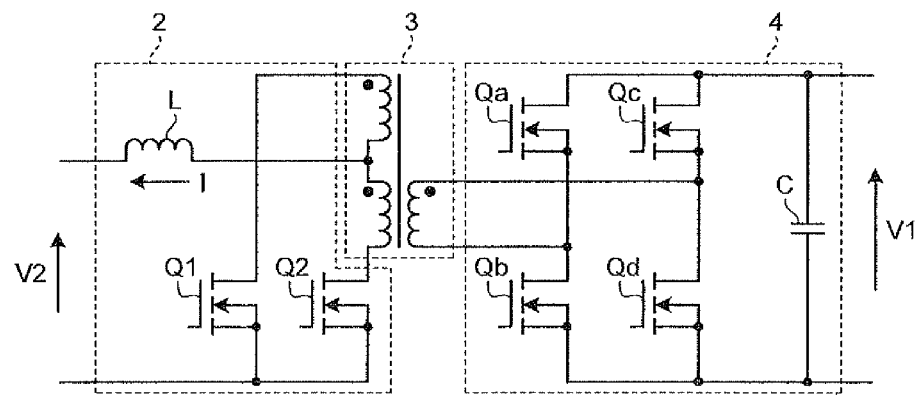
FIG. 2 is a circuit diagram illustrating the configurations of a current-source power converter and a voltage-source power converter of FIG. 1.

FIG. 2 is a circuit diagram illustrating the configurations of the current-source power converter 2 and the voltage-source power converter 4 of FIG. 1. In the embodiment illustrated in FIG. 2, the current-source power converter 2 with a push-pull structure is described as an example.

In FIG. 2, the current-source power converter 2 includes switching elements Q1 and Q2 and an inductor L. The switching element Q1 is connected between one end of secondary winding of the transformer 3 and the negative side of the capacitor 1. The switching element Q2 is connected between the other end of the secondary winding of the transformer 3 and the negative side of the capacitor 1. The inductor L is connected between the center tap of the secondary winding of the transformer 3 and the positive side of the capacitor 1.

The capacitor 1 and the inductor L form a current source and current from the current source is controlled by using the switching elements Q1 and Q2, so that operation as the current-source power converter 2 becomes possible.

The voltage-source power converter 4 includes switching elements Qa to Qd and a smoothing capacitor C. The switching elements Qa and Qb are connected in series with each other, and the switching elements Qc and Qd are connected in series with each other. A series circuit of the switching elements Qa and Qb and a series circuit of the switching elements Qc and Qd are connected in parallel with each other. The primary winding of the transformer 3 is connected between a connecting point of the switching elements Qa and Qb and a connecting point of the switching elements Qc and Qd. The smoothing capacitor C is connected in parallel with the series circuit of the switching elements Qc and Qd.

Each of the switching elements Q1, Q2, and Qa to Qd may be a field-effect transistor, a bipolar transistor, or an insulated-gate bipolar transistor (IGBT). A body diode may be formed in the switching elements Q1, Q2, and Qa to Qd.

Figure 3:
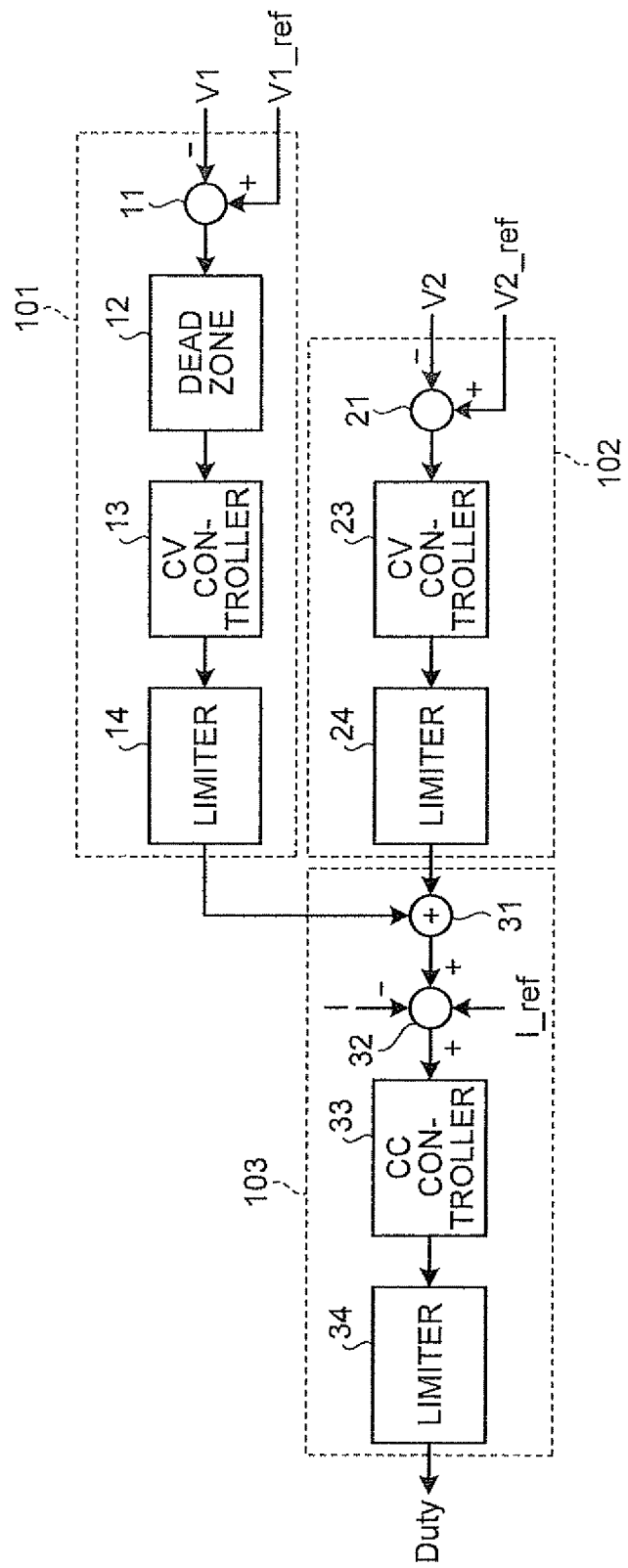
FIG. 3 is a block diagram illustrating the configuration of a controller of FIG. 1.

FIG. 3 is a block diagram illustrating the configuration of the controller 5 of FIG. 1.

In FIG. 3, the controller 5 includes a rail-side voltage control system 101, a charging-side voltage control system 102, and a current control system 103. The current control system 103 is arranged in the subsequent stage of the rail-side voltage control system 101 and the charging-side voltage control system 102. The rail-side voltage control system 101 and the charging-side voltage control system 102 are arranged in parallel with each other.

In the rail-side voltage control system 101, a dead zone 12 is arranged in the subsequent stage of a subtractor 11; a constant voltage (CV) controller 13 is arranged in the subsequent stage of the dead zone 12; and a limiter 14 is arranged in the subsequent stage of the CV controller 13. The dead zone 12 can limit variation in an input value of the CV controller 13 to values equal to or greater than a predetermined value at the time of charging in order to prevent the CV controller 13 from operating due to minute (slight) variation in the rail voltage V1 at the time of charging.

In the charging-side voltage control system 102, a CV controller 23 is arranged in the subsequent stage of a subtractor 21; and a limiter 24 is arranged in the subsequent stage of the CV controller 23.

In the current control system 103, an adder-subtractor 32 is arranged in the subsequent stage of an adder 31; a constant current (CC) controller 33 is arranged in the subsequent stage of the adder-subtractor 32; and a limiter 34 is arranged in the subsequent stage of the CC controller 33. A control parameter of the CC controller 33 can be set to a value common to both charging and discharging.

At the time of charging, the limiters 14, 24, and 34 can limit outputs as follows.

Limiter 14: the minimum value=$-\Delta I$ and the maximum value=$\Delta I$

Limiter 24: the minimum value=$-I\_ref$ and the maximum value=0

Limiter 34: the minimum value=0 and the maximum value=maximum duty

The reference value I_ref of the charging current I at the time of charging is a positive value. $\Delta I$ can be set to a predetermined value. In this case, the maximum value of the charging current I at the time of charging is $I\_ref + \Delta I$ and the minimum value is $-\Delta I$.

At the time of discharging, the limiters 14, 24, and 34 can limit outputs as follows.

Limiter 14: the minimum value=0 and the maximum value=$-I\_ref$

Limiter 24: the minimum value=0 and the maximum value=0

Limiter 34: the minimum value=0 and the maximum value=maximum duty

The reference value I_ref of the charging current I at the time of discharging is a negative value.

When the capacitor 1 discharges, the output from the charging-side voltage control system 102 is limited to 0 by the limiter 24 regardless of any variation in the charging voltage V2, and the rail-side voltage control system 101 and the current control system 103 generate a duty command Duty.

More specifically, the width of the dead zone 12 is set to 0 at the time of discharging. The subtractor 11 subtracts a detection value of the rail voltage V1 from a reference value V1_ref of the rail voltage, and inputs the obtained value to the CV controller 13 via the dead zone 12. The CV controller 13 generates a manipulated variable so that the detection value of the rail voltage V1 approaches the reference value V1_ref of the rail voltage, and outputs the manipulated variable to the limiter 14. The manipulated variable is limited to the range from 0 to the reference value I_ref of the charging current by the limiter 14 and is output to the adder-subtractor 32 via the adder 31.

The adder-subtractor 32 adds up the output value from the adder 31 and the reference value I_ref of the charging current, subtracts the detection value of the charging current I from the sum of the added values, and inputs the obtained value to the CC controller 33. The CC controller 33 generates a manipulated variable so that the detection value of the charging current I approaches the sum of the output value from the adder 31 and the reference value I_ref of the charging current, and outputs the manipulated variable to the limiter 34. The manipulated variable is limited to the range from 0 to the maximum duty by the limiter 34, so that the duty commend Duty is generated.

On the other hand, when the capacitor 1 charges, the output from the rail-side voltage control system 101 is limited by the limiter 14 such that the output takes not only a positive value but also a negative value. Then, the rail-side voltage control system 101, the charging-side voltage control system 102, and the current control system 103 generate the duty command Duty.

More specifically, at the time of charging, the width of the dead zone 12 is set to any value that is equal to or greater than 0, and thereafter, the subtractor 11 subtracts the detection value of the rail voltage V1 from the reference value V1_ref of the rail voltage and inputs the obtained value to the CV controller 13 via the dead zone 12.

Thereafter, the CV controller 13 generates a manipulated variable so that the detection value of the rail voltage V1 approaches the reference value V1_ref of the rail voltage, and outputs the manipulated variable to the limiter 14. The manipulated variable is limited to the range from 0 to the reference value I_ref of the charging current by the limiter 14 and is output to the adder 31.

The subtractor 21 subtracts the detection value of the charging voltage V2 from a reference value V2_ref of the charging current and inputs the obtained value to the CV controller 23.

The CV controller 23 generates a manipulated variable so that the detection value of the charging voltage V2 approaches the reference value V2_ref of the charging current, and outputs the manipulated variable to the limiter 24. The manipulated variable is limited to the range from the reference value I_ref of the charging current to 0 by the limiter 14 and is output to the adder 31.

Thereafter, the adder 31 adds up the output value from the limiter 14 and the output value from the limiter 24, and outputs the sum of the added values to the adder-subtractor 32. The adder-subtractor 32 adds up the output value from the adder 31 and the reference value I_ref of the charging current, subtracts the detection value of the charging current I from the sum of the added values, and inputs the obtained value to the CC controller 33. The CC controller 33 generates a manipulated variable so that the detection value of the charging current approaches the sum of the output value from the adder 31 and the reference value I_ref of the charging current and outputs the manipulated variable to the limiter 34. The manipulated variable is limited to the range from 0 to the maximum duty by the limiter 34, so that the duty command Duty is generated.

When the duty command Duty is generated, gate drive signals S1, S2, and Sa to Sd are generated based on the duty command Duty. The switching elements Q1 and Q2 of FIG. 2 are driven by the gate drive signals S1 and S2, and the switching elements Qa to Qd of FIG. 2 are driven by the gate drive signals Sa to Sd, so that the charging operation or the discharging operation is performed.

Figure 4:
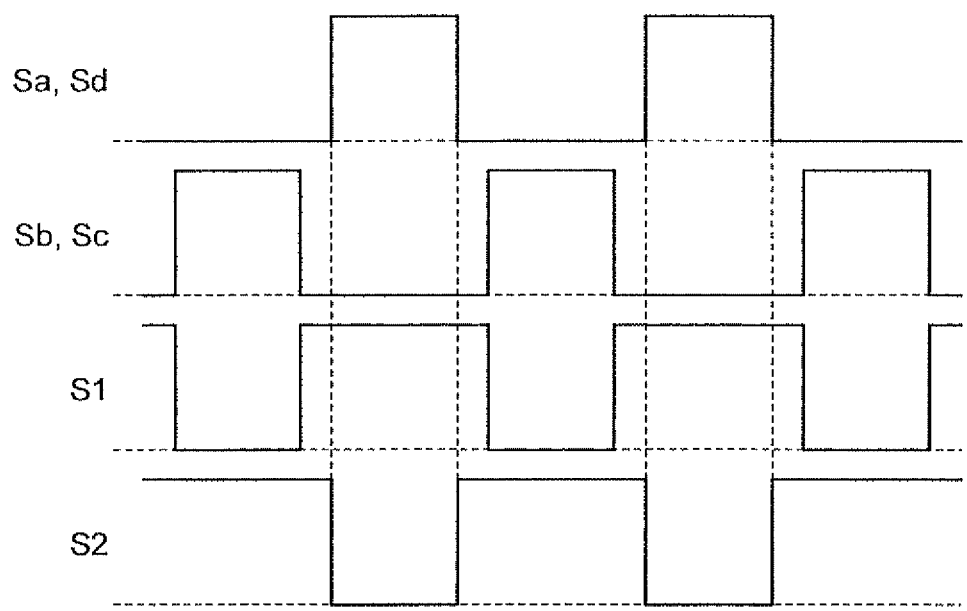
FIG. 4 is a timing diagram illustrating the waveforms of gate drive signals of FIG. 1.

FIG. 4 is a timing diagram illustrating the waveforms of the gate drive signals S1, S2, and Sa to Sd of FIG. 1.

In FIG. 4, the duty of each of the gate drive signals Sa to Sd is set based on the duty command Duty, so that the duties of the gate drive signals Sa to Sd are uniform. The phase of each of the gate drive signals Sa and Sd is shifted by a half cycle with respect to the phase of each of the gate drive signals Sb and Sc.

The gate drive signal S1 is generated by inverting the gate drive signals Sb and Sc, and the gate drive signal S2 is generated by inverting the gate drive signals Sa and Sd. Therefore, it is possible to generate the gate drive signals S1, S2, and Sa to Sd by using one duty command Duty.

When the charging voltage V2 decreases, the charging-side voltage control system 102 of FIG. 3 operates so that the charging voltage V2 increases. When the rail voltage V1 decreases, the rail-side voltage control system 101 operates so that the rail voltage V1 increases.

Therefore, by configuring the rail-side voltage control system 101 and the charging-side voltage control system 102 so that they can operate in parallel with each other at the time of charging, even when the charging voltage V2 decreases due to a decrease in the rail voltage V1, it is possible to suppress an increase in the rail voltage V1 and to increase the rail voltage V1. As a result, it is possible to suppress variation in the rail voltage V1.

Figure 5:
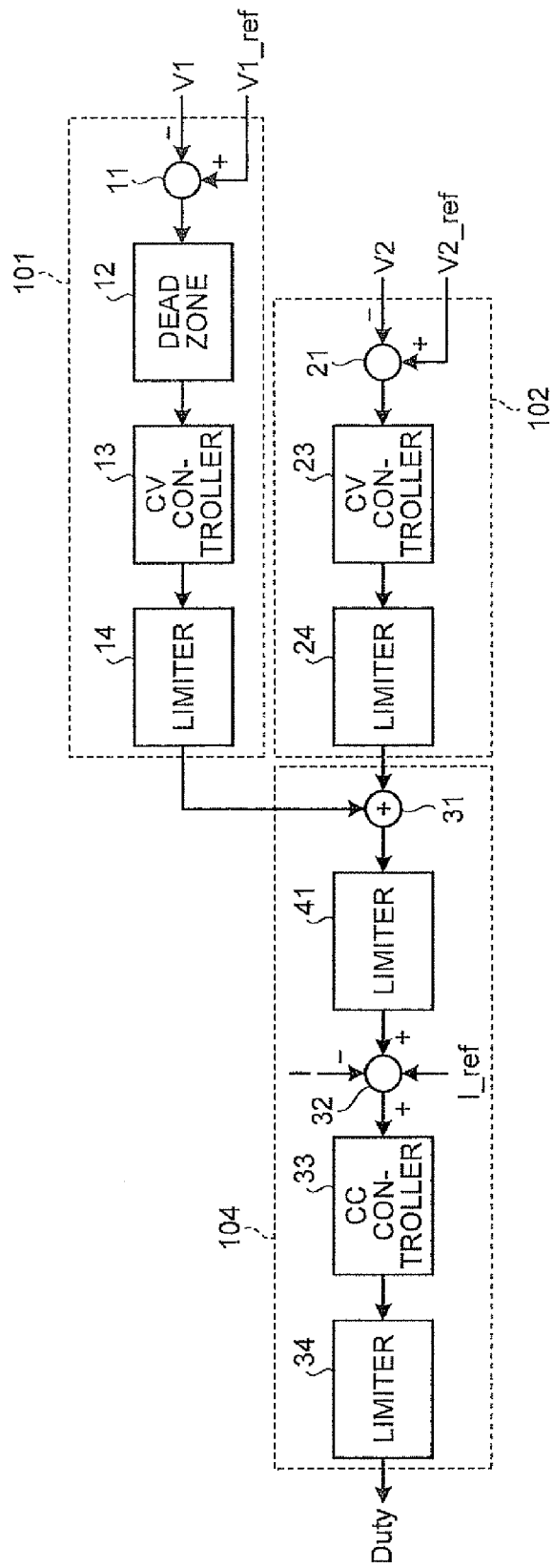
FIG. 5 is a block diagram illustrating the configuration of a controller that is applied to a DC-DC converter according to a second embodiment of the present invention.

FIG. 5 is a block diagram illustrating the configuration of a controller that is applied to a DC-DC converter according to a second embodiment of the present invention.

In FIG. 5, the controller includes a current control system 104 instead of the current control system 103 of FIG. 3. In the current control system 104, a limiter 41 is arranged in the preceding stage of the adder-subtractor 32.

At the time of charging, the limiter 41 can limit outputs as follows.

Limiter 41: the minimum value=−I_ref and maximum value=0

The reference value I_ref of the charging current I at the time of charging is a positive value.

At the time of discharging, the limiter 41 can limit outputs as follows.

Limiter 41: the minimum value=0 and maximum value=−I_ref

The reference value I_ref of the charging current I at the time of discharging is a negative value.

By arranging the limiter 41 in the preceding stage of the adder-subtractor 32, it is possible to limit the maximum value of the charging current I at the time of charging to the reference value I_ref and limit the minimum value to 0.

Figure 6:
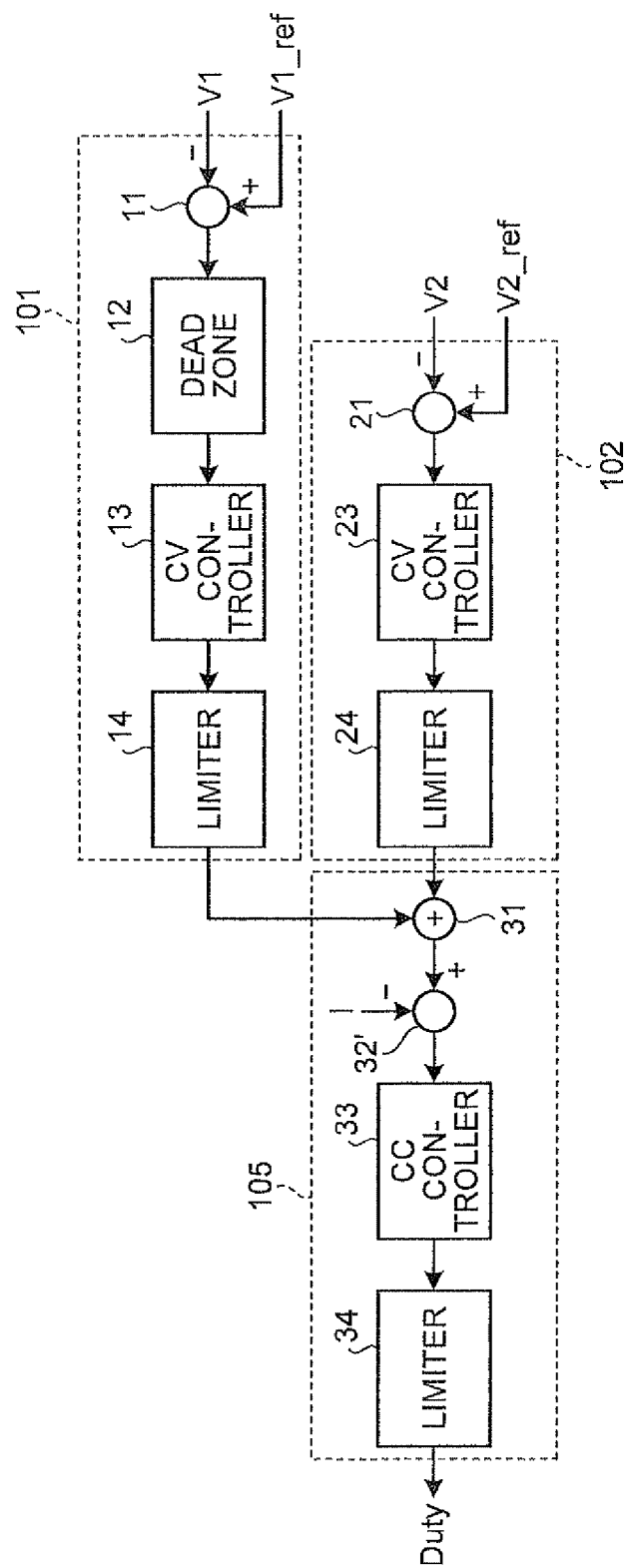
FIG. 6 is a block diagram illustrating the configuration of a controller that is applied to a DC-DC converter according to a third embodiment of the present invention.

FIG. 6 is a block diagram illustrating the configuration of a controller that is applied to a DC-DC converter according to a third embodiment of the present invention.

In FIG. 6, the controller includes a current control system 105 instead of the current control system 103 of FIG. 3. The current control system 105 includes a subtractor 32' instead of the adder-subtractor 32. The subtractor 32' can omit input of the reference value I_ref of the charging current I and can subtract the detection value of the charging current I from the sum obtained by the adder 31.

At the time of charging, the limiters 14, 24, and 34 can limit outputs as follows.

Limiter 14: the minimum value=−ΔI and the maximum value=ΔI

Limiter 24: the minimum value=0 and the maximum value=I_ref

Limiter 34: the minimum value=0 and the maximum value=maximum duty

The reference value I_ref of the charging current I at the time of charging is a positive value. In this case, the maximum value of the charging current I at the time of charging is I_ref+ΔI and the minimum value is −ΔI.

At the time of discharging, the limiters 14, 24, and 34 can limit outputs as follows.

Limiter 14: the minimum value=−I_ref, and the maximum value=0

Limiter 24: the minimum value=0, and the maximum value=0

Limiter 34: the minimum value=0, and the maximum value=maximum duty

The reference value I_ref of the charging current I at the time of discharging is a negative value.

Figure 7:
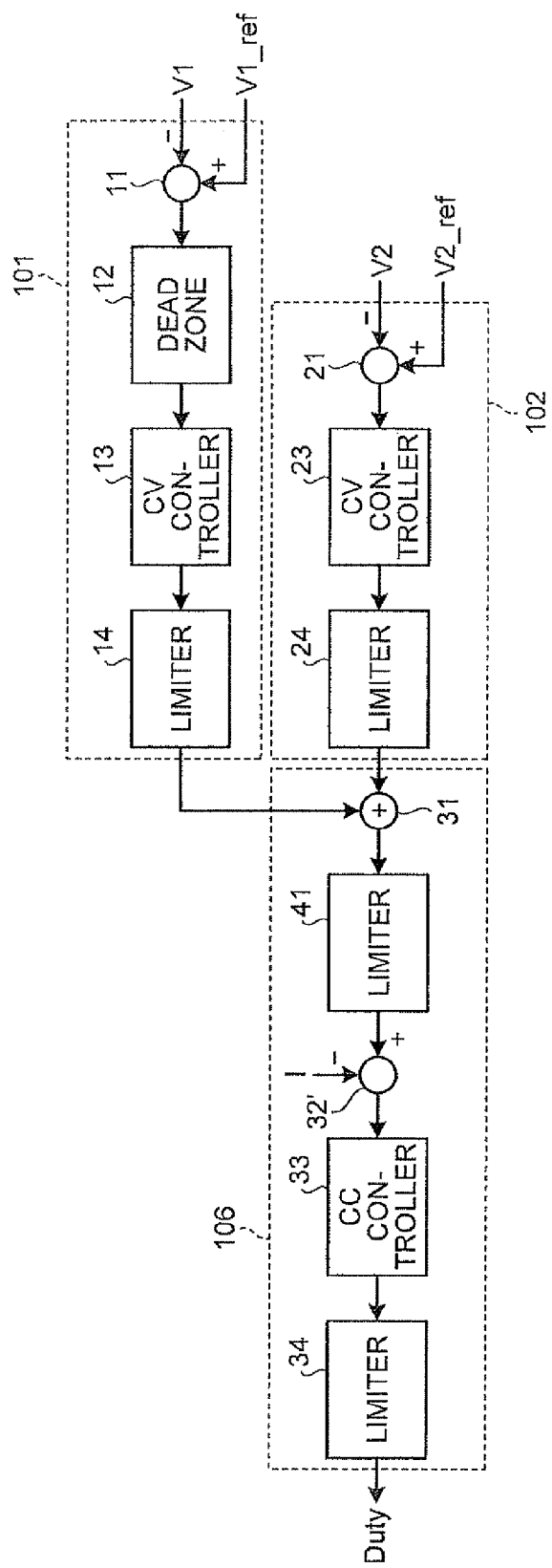
FIG. 7 is a block diagram illustrating the configuration of a controller that is applied to a DC-DC converter according to a fourth embodiment of the present invention.

FIG. 7 is a block diagram illustrating the configuration of a controller that is applied to a DC-DC converter according to a fourth embodiment of the present invention.

In FIG. 7, the controller includes a current control system 106 instead of the current control system 105 of FIG. 6. In the current control system 106, the limiter 41 is arranged in the preceding stage of the subtractor 32'.

At the time of charging, the limiters 14, 24, 34, and 41 can limit outputs as follows.

Limiter 14: the minimum value=−ΔI and the maximum value=ΔI

Limiter 24: the minimum value=0 and the maximum value=I_ref

Limiter 34: the minimum value=0 and the maximum value=maximum duty

Limiter 41: the minimum value=0 and the maximum value=I_ref

The reference value I_ref of the charging current I at the time of charging is a positive value. In this case, the maximum value of the charging current I at the time of charging is I_ref and the minimum value is 0.

At the time of discharging, the limiters 14, 24, 34, and 41 can limit outputs as follows.

Limiter 14: the minimum value=−I_ref and the maximum value=0

Limiter 24: the minimum value=0 and the maximum value=0

Limiter 34: the minimum value=0 and the maximum value=maximum duty

Limiter 41: the minimum value=I_ref and the maximum value=0

The reference value I_ref of the charging current I at the time of discharging is a negative value.

Figure 8:
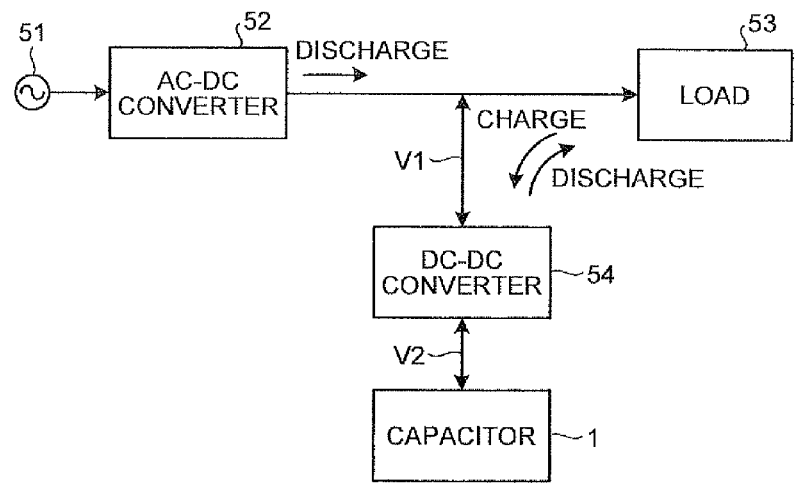
FIG. 8 is a block diagram illustrating the configuration of a power supply system to which the DC-DC converter of FIG. 1 is applied.

FIG. 8 is a block diagram illustrating the configuration of a power supply system to which the DC-DC converter of FIG. 1 is applied.

In FIG. 8, a load 53 is connected to an alternating-current power supply 51 via an AC-DC converter 52. The load 53 may be, for example, an electronic device that operates with direct current; or a direct-current motor. For further example, the load 53 may be a solar battery cell or an electrical generator.

The capacitor 1 is connected to the load 53 via a DC-DC converter 54. The DC-DC converter 54 may be configured as illustrated in FIG. 1 for example.

Alternating current output from the alternating-current power supply 51 is converted into direct current by the AC-DC converter 52, and the direct current is output to the load 53.

When energy generated by the load 53 is accumulated in the capacitor 1, the DC-DC converter 54 converts the rail voltage V1 into the charging voltage V2 and charges the capacitor 1. On the other hand, when the load 53 needs electric power while the alternating-current power supply 51 is cut off for example, the DC-DC converter 54 converts the charging voltage V2 into the rail voltage V1 and supplies electric power to the load 53.

By applying the configuration illustrated in FIG. 1 to the DC-DC converter 54, it is possible to suppress an increase in the charging voltage V2 and to increase the rail voltage V1 even when the charging voltage V2 decreases due to a decrease in the rail voltage V1. Therefore, it is possible to suppress variation in the rail voltage V1.

Figure 9:
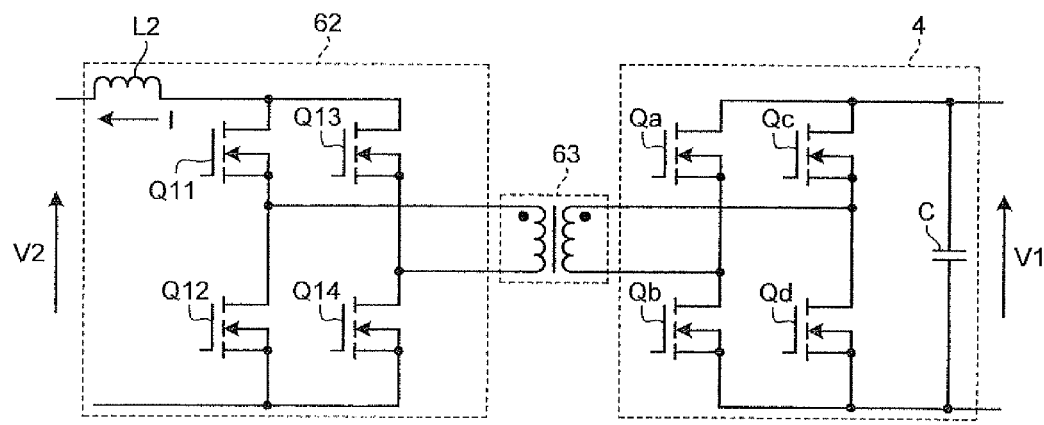
FIG. 9 is a circuit diagram illustrating the configurations of a current-source power converter and a voltage-source power converter that are applied to a DC-DC converter according to a fifth embodiment of the present invention.

FIG. 9 is a circuit diagram illustrating the configurations of a current-source power converter 62 and the voltage-source power converter 4 that are applied to a DC-DC converter according to a fifth embodiment of the present invention. In the embodiment illustrated in FIG. 9, the current-source power converter 62 with a full-bridge structure is described as an example.

In FIG. 9, the DC-DC converter includes the current-source power converter 62 and a transformer 63. The other configuration of the DC-DC converter is the same as that of FIG. 1.

The current-source power converter 62 includes switching elements Q11 to Q14 and an inductor L2. The switching elements Q11 and Q12 are connected in series with each other, and the switching elements Q13 and Q14 are connected in series with each other. A series circuit of the switching elements Q11 and Q12 and a series circuit of the switching elements Q13 and Q14 are connected in parallel with each other. The secondary winding of the transformer 63 is connected between a connecting point of the switching elements Q11 and Q12 and a connecting point of the switching elements Q13 and Q14. The inductor L2 is connected between the connecting point of the switching elements Q13 and Q14 and the positive side of the capacitor 1.

Each of the switching elements Q11 to Q14 may be a field-effect transistor, a bipolar transistor, or an IGBT. A body diode may be formed in the switching elements Q11 to Q1.

The capacitor 1 of FIG. 1 and the inductor L2 form a current source and current from the current source is controlled by using the switching elements Q11 to Q14, so that operation as the current-source power converter 62 is possible.

In the DC-DC converter, gates of the switching elements Q12 and Q13 are driven by the gate drive signal S1 of FIG. 4, and gates of the switching elements Q11 and Q14 are driven by the gate drive signal S2 of FIG. 4. The other operation of the DC-DC converter is the same as that of the DC-DC converter of FIG. 1.

The current-source power converter 2 having the push-pull structure as illustrated in FIG. 2 is advantageous when the charging voltage V2 is low or a variation range of the rail voltage V1 is narrow. The current-source power converter 2 can simplify a circuit structure compared to the current-source power converter 62 having the full-bridge structure as illustrated in FIG. 9.

On the other hand, when the charging voltage V2 is high or a variation range of the rail voltage V1 is wide, because a voltage stress of the switching elements Q1 and Q2 increases, it is preferable to use the current-source power converter 62 having the full-bridge structure as illustrated in FIG. 9.

As described above, according to one aspect of the present invention, it is possible to suppress variation in a rail voltage at the time of charging operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A DC-DC converter comprising:
   a transformer;
   a voltage-source power converter that performs power conversion by controlling a voltage applied to a primary side of the transformer;
   a current-source power converter that performs power conversion by controlling current that flows through a secondary side of the transformer; and
   a controller that controls, at the time of charging operation, the voltage-source power converter and the current-source power converter based on a detection value of a rail voltage input to the voltage-source power converter and a detection value of a charging voltage output from the current-source power converter,
   wherein the controller further includes:
      a subtractor that is arranged in a preceding stage of the first constant voltage controller; and
      a dead zone that is arranged between the subtractor and the first constant voltage controller and limits variation in an input value of the first constant voltage controller to values equal to or greater than a predetermined value at the time of charging.

2. The DC-DC converter according to claim 1, wherein when the rail voltage decreases, the controller controls the voltage-source power converter and the current-source power converter so as to decrease the charging voltage or charging current to thereby increase the rail voltage.

3. The DC-DC converter according to claim 1, wherein the controller controls, at the time of discharging operation, the voltage-source power converter and the current-source power converter based on a detection value of a rail voltage output from the voltage-source power converter, without referring to a detection value of a charging voltage input to the current-source power converter.

4. The DC-DC converter according to claim 1, wherein the voltage-source power converter includes:
   a first series circuit in which a first switching element and a second switching element are connected in series with each other; and
   a second series circuit in which a third switching element and a fourth switching element are connected in series with each other, wherein
   the first series circuit and the second series circuit are connected in parallel with each other, and
   a primary winding of the transformer is connected between a connecting point of the first switching element and the second switching element and a connecting point of the third switching element and the fourth switching element.

5. The DC-DC converter according to claim 1, wherein the current-source power converter includes:
   an inductor that supplies current from a direct-current power supply to a center tap of a secondary winding of the transformer;
   a fifth switching element that is connected between one end of the secondary winding and a negative side of the direct-current power supply; and
   a sixth switching element that is connected between the other end of the secondary winding and the negative side of the direct-current power supply.

6. The DC-DC converter according to claim 1, wherein the current-source power converter includes:
   a third series circuit in which a fifth switching element and a sixth switching element are connected in series with each other; and
   a fourth series circuit in which a seventh switching element and an eighth switching element are connected in series with each other, wherein
   the third series circuit and the fourth series circuit are connected in parallel with each other,
   secondary winding of the transformer is connected between a connecting point of the fifth switching element and the sixth switching element and a connecting point of the seventh switching element and the eighth switching element, and
   the current-source power converter further includes:
   an inductor that is arranged between a connecting point of the fifth switching element and the seventh switching element and a positive side of a direct-current power supply.

7. The DC-DC converter according to claim 1, wherein the control unit includes:
   a first constant voltage controller that outputs a first manipulated variable so that a detection value of the rail voltage approaches a reference value of the rail voltage;
   a second constant voltage controller that operates in parallel with the first constant voltage controller and outputs a second manipulated variable so that a detection value of the charging voltage approaches a reference value of the charging voltage; and
   a constant current controller that is arranged in a subsequent stage of the first constant voltage controller and the second constant voltage controller, and outputs a third manipulated variable based on the first manipulated variable, the second manipulated variable, and a detection value of charging current.

8. The DC-DC converter according to claim 7, wherein the controller further includes:
   a first limiter that controls the first manipulated variable so that the first manipulated variable is limited to a range from 0 to a positive reference value of the charging current at the time of discharging and so that the first manipulated variable takes not only a positive value but also a negative value at the time of charging; and
   a second limiter that controls the first manipulated variable so that the first manipulated variable is limited to 0 at the time of discharging and so that the first manipulated variable is limited to a range from a negative reference value of the charging current to 0.

9. The DC-DC converter according to claim 8, wherein the controller further includes:
   a third limiter that controls a sum of an output value from the first limiter and an output value from the second limiter so that the sum is limited to a range from 0 to a positive reference value of the charging current at the time of discharging and so that the sum is limited to a range from the negative reference value of the charging current to 0 at the time of charging.

10. The DC-DC converter according to claim 7, wherein the controller further includes:
    a first limiter that controls the first manipulated variable so that the first manipulated variable is limited to a range from a negative reference value of the charging current to 0 at the time of discharging and so that the first manipulated variable takes not only a positive value but also a negative value at the time of charging; and
    a second limiter that controls the first manipulated variable so that the first manipulated value is limited to 0 at the time of discharging and so that the first manipulated variable is limited to a range from 0 to a positive reference value of the charging current.

11. The DC-DC converter according to claim 10, wherein the controller further includes:
    a third limiter that controls a sum of an output value from the first limiter and an output value from the second limiter so that the sum is limited to a range from the negative reference value of the charging current to 0 at the time of discharging and so that the sum is limited to a range from 0 to the positive reference value of the charging current at the time of charging.

12. The DC-DC converter according to claim 7, wherein a control parameter of the constant current controller is set to a value common to both charging and discharging.

13. A DC-DC converter comprising:
    a transformer;
    a voltage-source power converter that performs power conversion by controlling a voltage applied to a primary side of the transformer;
    a current-source power converter that performs power conversion by controlling current that flows through a secondary side of the transformer; and
    a controller that controls, at the time of charging operation, the voltage-source power converter and the current-source power converter based on a detection value of a rail voltage input to the voltage-source power converter and a detection value of a charging voltage output from the current-source power converter,
    wherein the control unit includes:

a first constant voltage controller that outputs a first manipulated variable so that a detection value of the rail voltage approaches a reference value of the rail voltage;

a second constant voltage controller that operates in parallel with the first constant voltage controller and outputs a second manipulated variable so that a detection value of the charging voltage approaches a reference value of the charging voltage; and a constant current controller that is arranged in a subsequent stage of the first constant voltage controller and the second constant voltage controller, and outputs a third manipulated variable based on the first manipulated variable, the second manipulated variable, and a detection value of charging current, the controller further includes:

a first limiter that controls the first manipulated variable so that the first manipulated variable is limited to a range from 0 to a positive reference value of the charging current at the time of discharging and so that the first manipulated variable takes not only a positive value but also a negative value at the time of charging; and a second limiter that controls the first manipulated variable so that the first manipulated variable is limited to 0 at the time of discharging and so that the first manipulated variable is limited to a range from a negative reference value of the charging current to 0.

14. The DC-DC converter according to claim 13, wherein the controller further includes:

a third limiter that controls a sum of an output value from the first limiter and an output value from the second limiter so that the sum is limited to a range from 0 to a positive reference value of the charging current at the time of discharging and so that the sum is limited to a range from the negative reference value of the charging current to 0 at the time of charging.

15. A DC-DC converter comprising:

a transformer;

a voltage-source power converter that performs power conversion by controlling a voltage applied to a primary side of the transformer;

a current-source power converter that performs power conversion by controlling current that flows through a secondary side of the transformer; and a controller that controls, at the time of charging operation, the voltage-source power converter and the current-source power converter based on a detection value of a rail voltage input to the voltage-source power converter and a detection value of a charging voltage output from the current-source power converter, wherein the control unit includes:

a first constant voltage controller that outputs a first manipulated variable so that a detection value of the rail voltage approaches a reference value of the rail voltage;

a second constant voltage controller that operates in parallel with the first constant voltage controller and outputs a second manipulated variable so that a detection value of the charging voltage approaches a reference value of the charging voltage; and a constant current controller that is arranged in a subsequent stage of the first constant voltage controller and the second constant voltage controller, and outputs a third manipulated variable based on the first manipulated variable, the second manipulated variable, and a detection value of charging current, the controller further includes:

a first limiter that controls the first manipulated variable so that the first manipulated variable is limited to a range from a negative reference value of the charging current to 0 at the time of discharging and so that the first manipulated variable takes not only a positive value but also a negative value at the time of charging; and a second limiter that controls the first manipulated variable so that the first manipulated value is limited to 0 at the time of discharging and so that the first manipulated variable is limited to a range from 0 to a positive reference value of the charging current.

16. The DC-DC converter according to claim 15, wherein the controller further includes:

a third limiter that controls a sum of an output value from the first limiter and an output value from the second limiter so that the sum is limited to a range from the negative reference value of the charging current to 0 at the time of discharging and so that the sum is limited to a range from 0 to the positive reference value of the charging current at the time of charging.

* * * * *